United States Patent [19]
Takahashi et al.

[11] Patent Number: 5,207,206
[45] Date of Patent: May 4, 1993

[54] METHOD FOR CONTROLLING THE SUPERCHARGE PRESSURE IN INTERNAL COMBUSTION ENGINE

[75] Inventors: Nobu Takahashi; Yasuyuki Sandou, both of Saitama, Japan

[73] Assignee: Honda Giken Kogyo Kabushiki Kaisha, Tokyo, Japan

[21] Appl. No.: 788,553

[22] Filed: Nov. 6, 1991

[30] Foreign Application Priority Data

Nov. 6, 1990 [JP] Japan .................. 2-300229

[51] Int. Cl.$^5$ .......................................... F02B 33/36
[52] U.S. Cl. ............................ 123/564; 418/201.2
[58] Field of Search ................ 123/564; 418/201.2

[56] References Cited

U.S. PATENT DOCUMENTS

| | | | |
|---|---|---|---|
| 4,826,412 | 5/1989 | Kubo et al. ............... | 123/564 X |
| 5,090,392 | 2/1992 | Nakano et al. ............ | 123/564 |
| 5,115,788 | 5/1992 | Sasaki et al. ............. | 123/564 X |

FOREIGN PATENT DOCUMENTS

| | | | |
|---|---|---|---|
| 46435 | 3/1989 | Japan . | |
| 23318 | 1/1991 | Japan ................... | 123/564 |
| 88916 | 4/1991 | Japan ................... | 123/564 |

*Primary Examiner*—Michael Koczo
*Attorney, Agent, or Firm*—Lyon & Lyon

[57] ABSTRACT

A method for controlling the supercharge pressure in an internal combustion engine having a mechanical supercharger which is connected to the crankshaft in the engine and in which the internal compression ratio of the supercharger can be varied. In the method, the internal compression ratio of the mechanical supercharge is varied on the basis of at least a preset supercharge pressure and an engine revolution rate. This ensures that the supercharge pressure can be matched with the internal compression ratio to prevent a pulsing, thereby preventing noise from being generated.

9 Claims, 13 Drawing Sheets

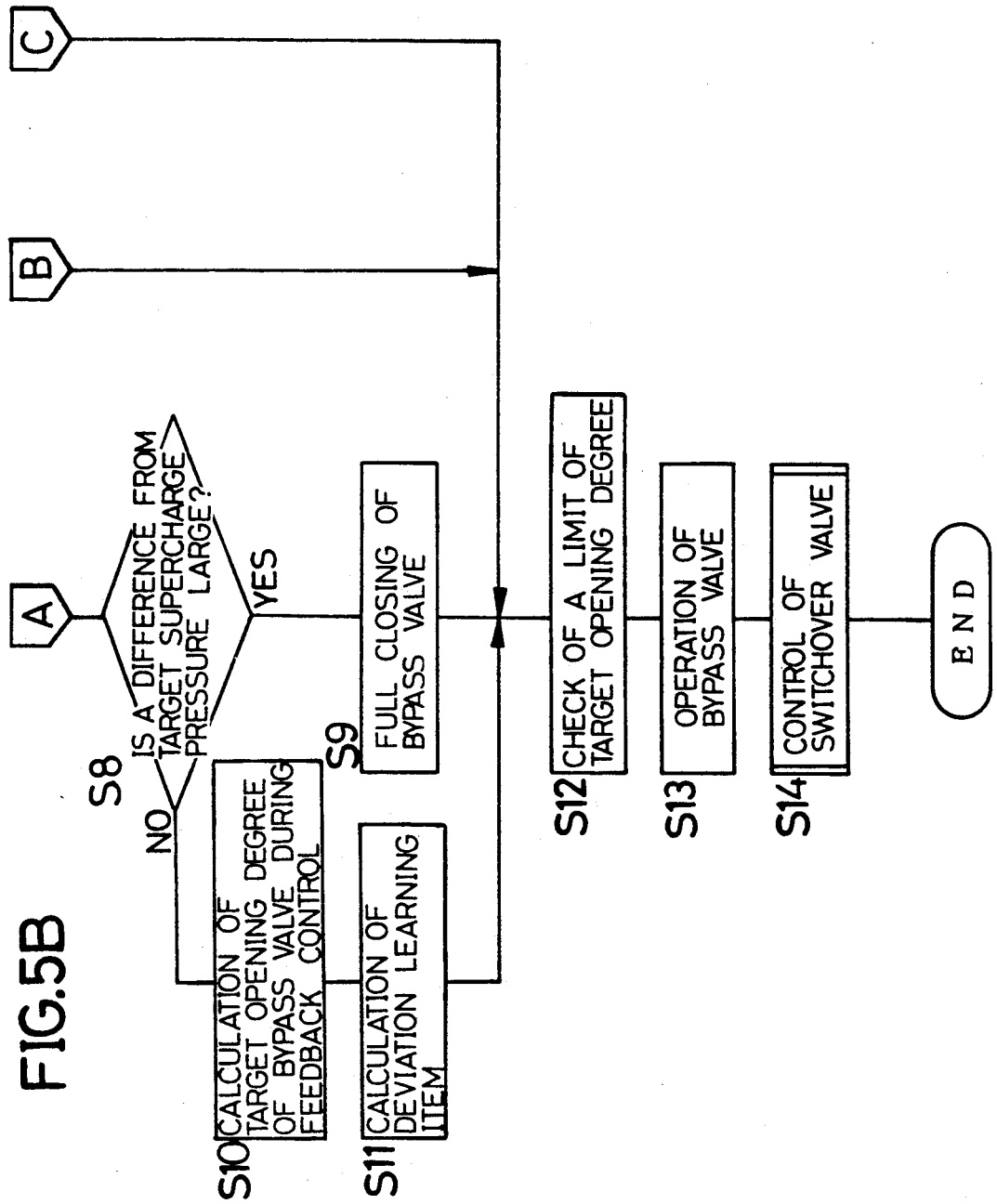

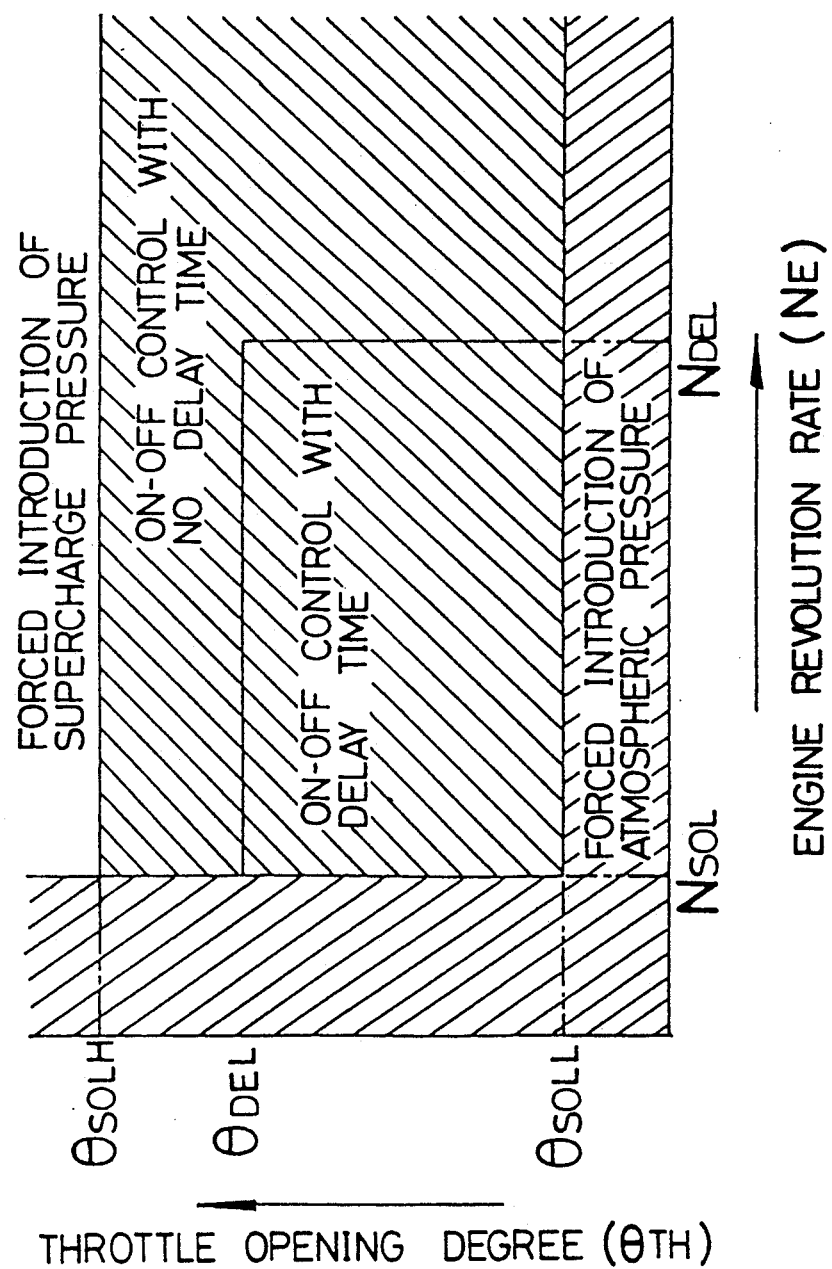

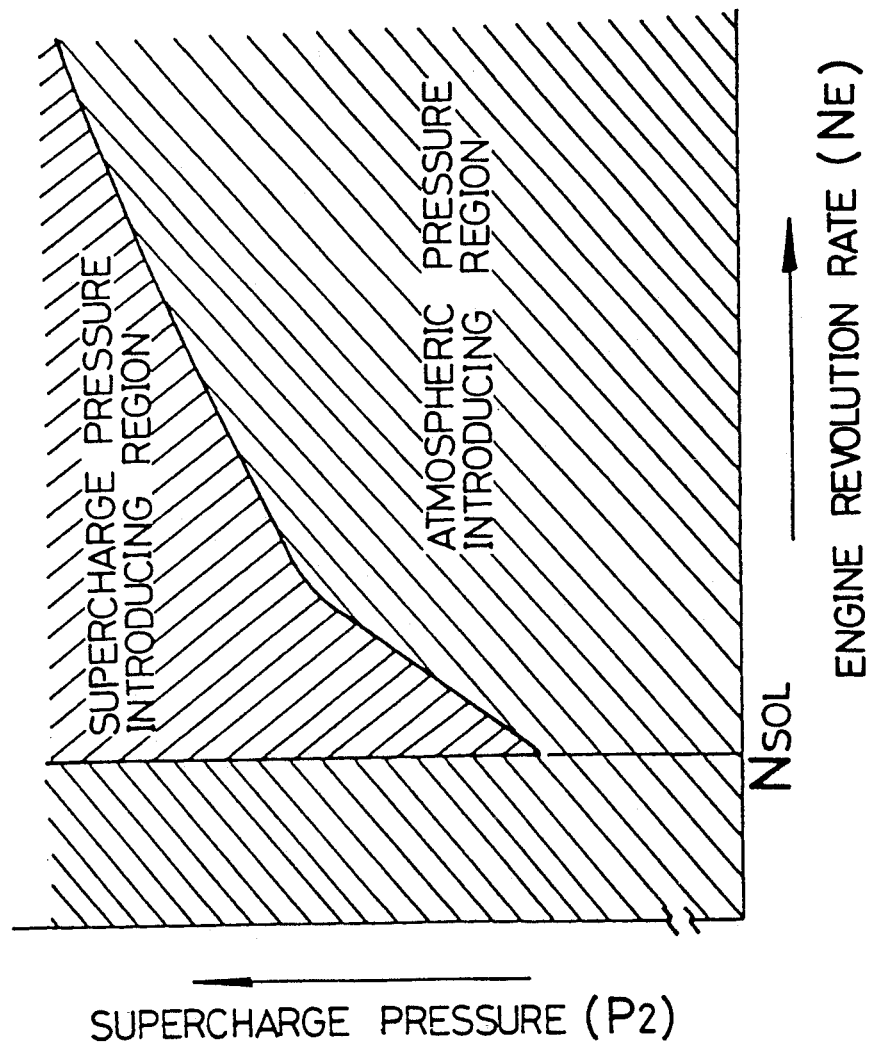

METHOD FOR CONTROLLING THE SUPERCHARGE PRESSURE IN INTERNAL COMBUSTION ENGINE

BACKGROUND OF THE INVENTION

1. Field of the Invention

The field of the present invention is methods for controlling the supercharge pressure in an internal combustion engine having a mechanical supercharger which is connected to the engine crankshaft and whose internal compression ratio can be varied.

2. Description of the Prior Art

An internal combustion engine having a mechanical supercharger whose internal compression ratio is variable is already known, for example, from Japanese Utility Model Application Laid-Open No. 46435/89 or the like. In the internal combustion engine disclosed in Japanese Utility Model Application Laid-Open No. 46435/89, the supercharger internal compression is controlled in a two-stage manner in accordance with the ratio of the pressure in the discharge side of the mechanical supercharger to the pressure in the intake side. However, the mechanical supercharger is driven by the output power from the engine body, and if the internal compression ratio is switched over without consideration of the engine revolution rate as described above, a large difference between the pressure in the supercharger and the supercharge pressure is produced to cause a discharge pulsing which produces a noise.

SUMMARY OF THE INVENTION

Accordingly, it is an object of the present invention to provide a method for controlling the supercharge pressure in an internal combustion engine, wherein the generation of a discharge pulsing is avoided to prevent noise.

To achieve the above object, according to a first aspect of the present invention, there is provided a method for controlling the supercharge pressure in an internal combustion engine having a mechanical supercharger which is connected to the engine crankshaft and whose internal compression ratio can be varied, wherein the internal compression ratio of the mechanical supercharger is varied on the basis of at least a preset supercharge pressure and an engine revolution rate. With this first feature, the supercharge pressure and the internal compression rate can be matched to each other by a control in consideration of the engine revolution rate, thereby preventing a pulsing to prevent noise from being generated.

In addition, it is a second feature of the present invention that in varying the internal compression ratio of the mechanical supercharger from a low level to a high level, the internal compression ratio is increased after a state satisfying a condition for increasing the internal compression ratio is maintained for a predetermined time. With this second feature, any noise normally occurring upon a variation in discharge pressure has difficulty leaking to the outside when the internal compression ratio is switched over from a low-compression state to a high-compression state and, therefore, the frequency of operation can be reduced with a delay time, leading to an improvement in durability.

It is a third feature of the present invention that the internal compression ratio is immediately increased when a driver's desire to accelerate is detected within the predetermined time. With this third feature, the internal compression ratio can be immediately brought into the high-compression state without a delay time, when the driver desires to increase the speed of the vehicle, leading to an enhanced response.

It is a fourth feature of the present invention that a reference value of the supercharge pressure for increasing the internal compression ratio of the mechanical supercharger is set such that it is larger as the engine revolution rate is higher. With this fourth feature, a control more appropriately associated with the supercharge pressure can be achieved by increasing the internal compression ratio by a higher supercharge pressure in a region in which the engine revolution rate is higher. This contributes to an improvement in efficiency.

The above and other objects, features and advantages of the invention will become apparent from a reading of the following description of the preferred embodiment, taken in conjunction with the accompanying drawings.

BRIEF DESCRIPTION OF THE DRAWINGS

The drawings illustrate a preferred embodiment of the present invention, wherein

FIGS. 5A and 5B are a flow chart illustrating a main routine for controlling the operation of a bypass valve and the supercharger;

FIG. 10 is a diagram illustrating a control region associated with the engine revolution rate and the throttle opening degree; and FIG. 11 is a diagram illustrating a supercharge pressure introducing region and an atmospheric pressure introducing region associated with the engine revolution rate and the supercharge pressure.

DESCRIPTION OF THE PREFERRED EMBODIMENT

The present invention will now be described by way of a preferred embodiment of the present invention in connection with the accompanying drawings.

Figure 1:
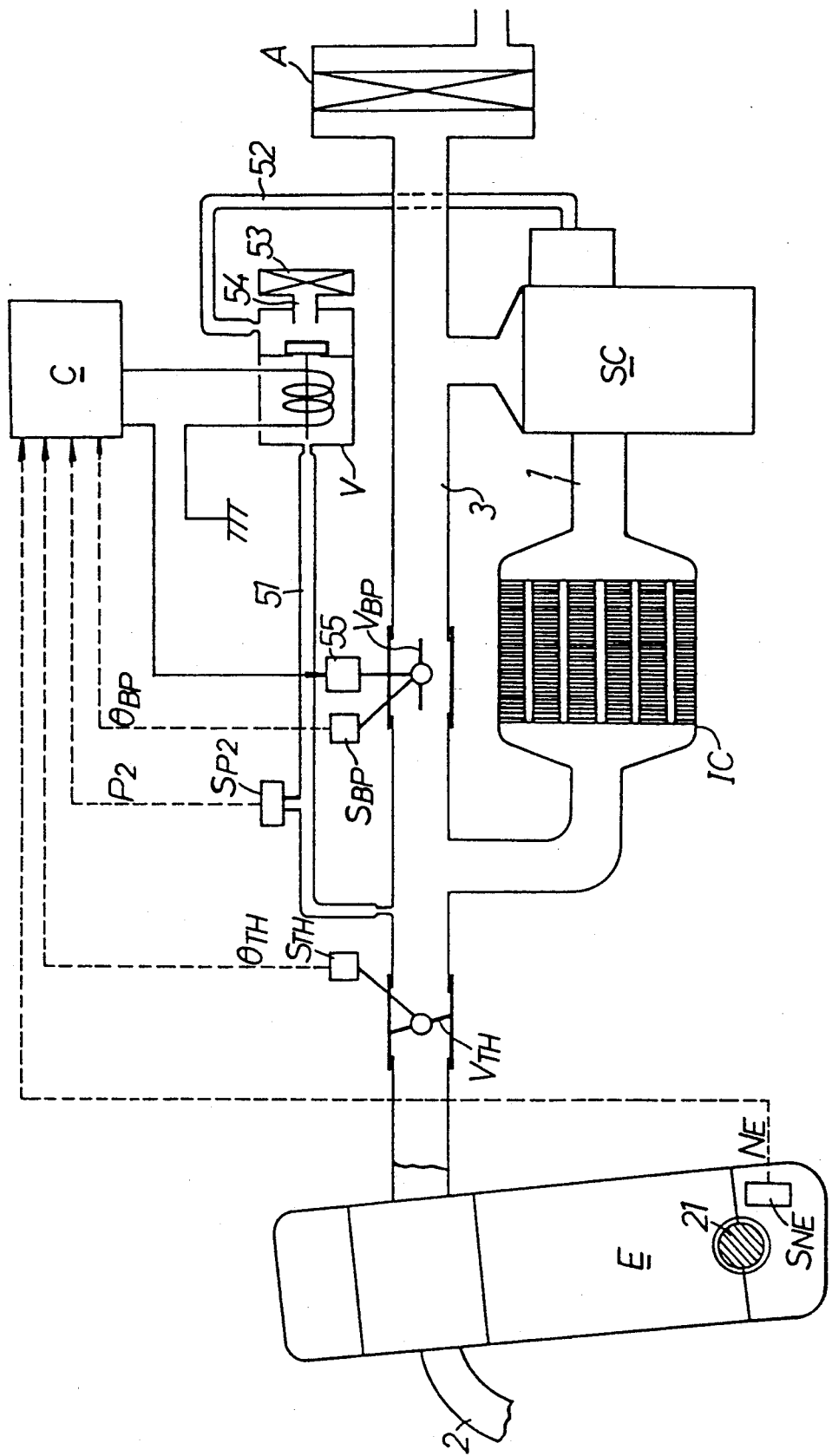
FIG. 1 is a diagram of the entire system for using method of this invention.

Referring first to FIG. 1, an intake passage 1 and an exhaust passage 2 are connected to an internal combustion engine E, and an air cleaner A is connected to an upstream end of the intake passage 1. A mechanical supercharger SC, an intercooler IC and a throttle valve $V_{TH}$ are provided in the middle of the intake passage 1 in sequence from its upstream end. A bypass passage 3 for detouring around the mechanical supercharger SC and the intercooler IC is connected to the intake passage 1. A bypass valve $V_{BP}$ is provided in the bypass passage 3.

Figure 2:
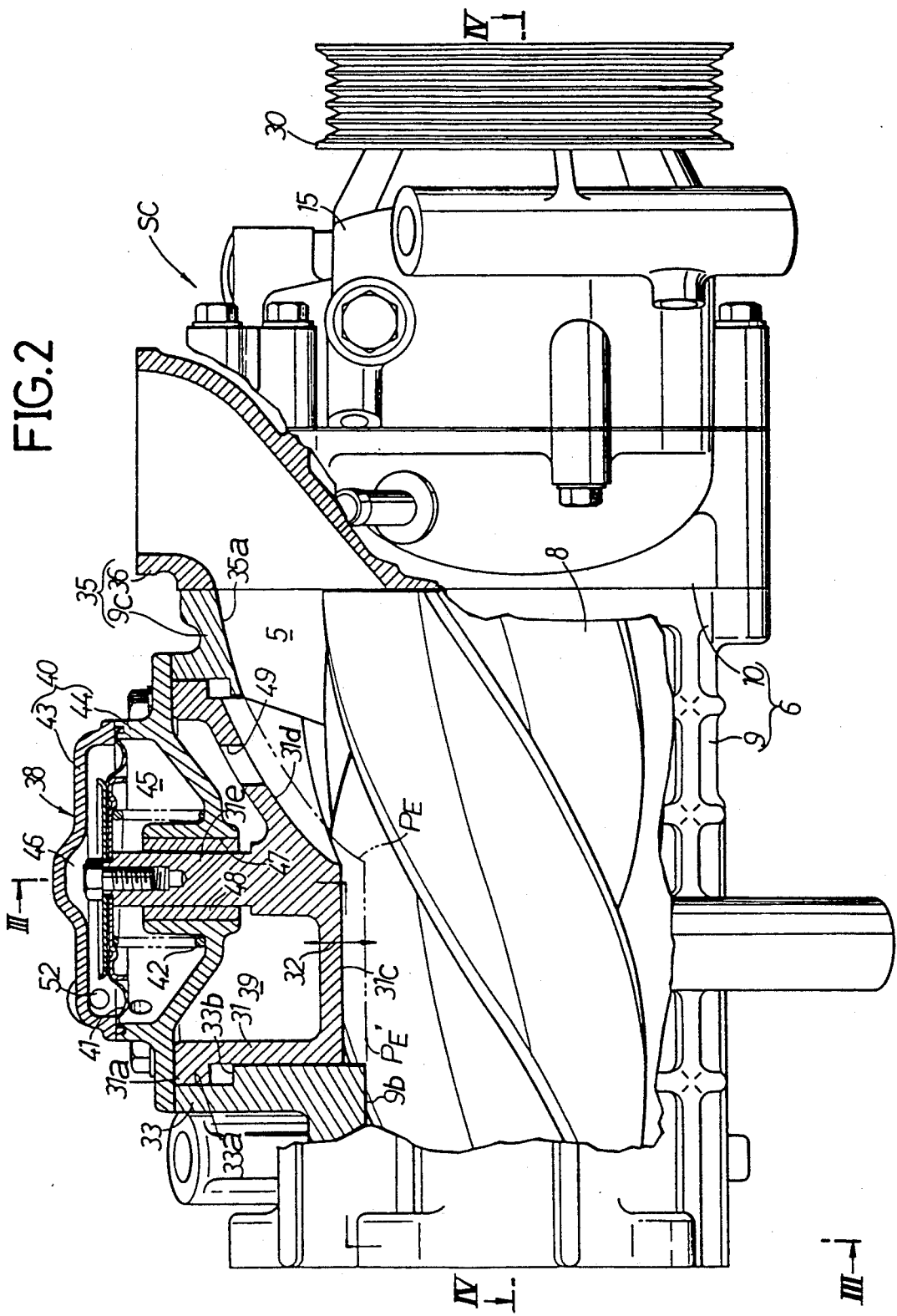
FIG. 2 is a partially cutaway longitudinal sectional side view of a supercharger.
Figure 3:
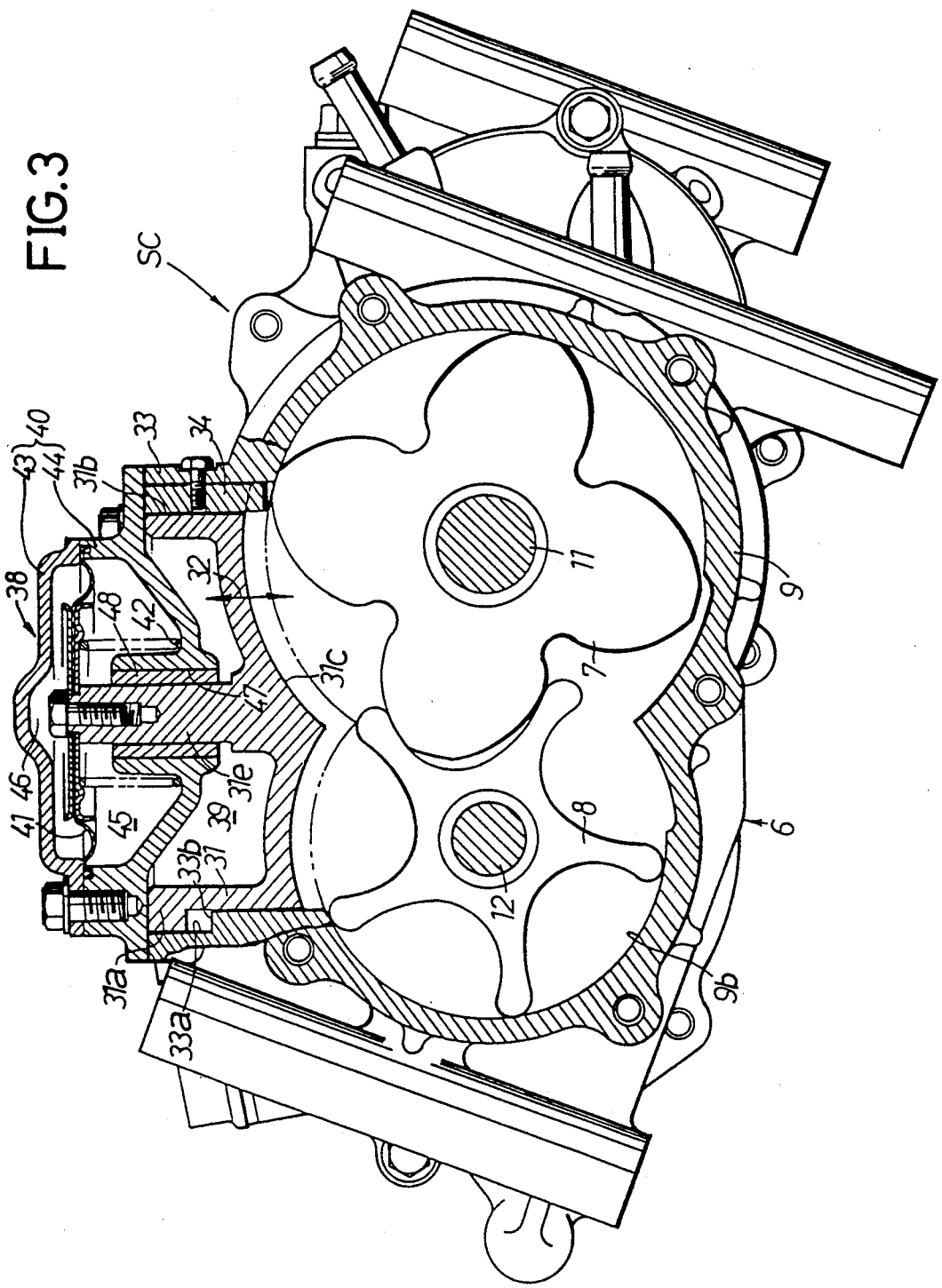
FIG. 3 is a sectional view taken along a line III—III in FIG. 2.
Figure 4:
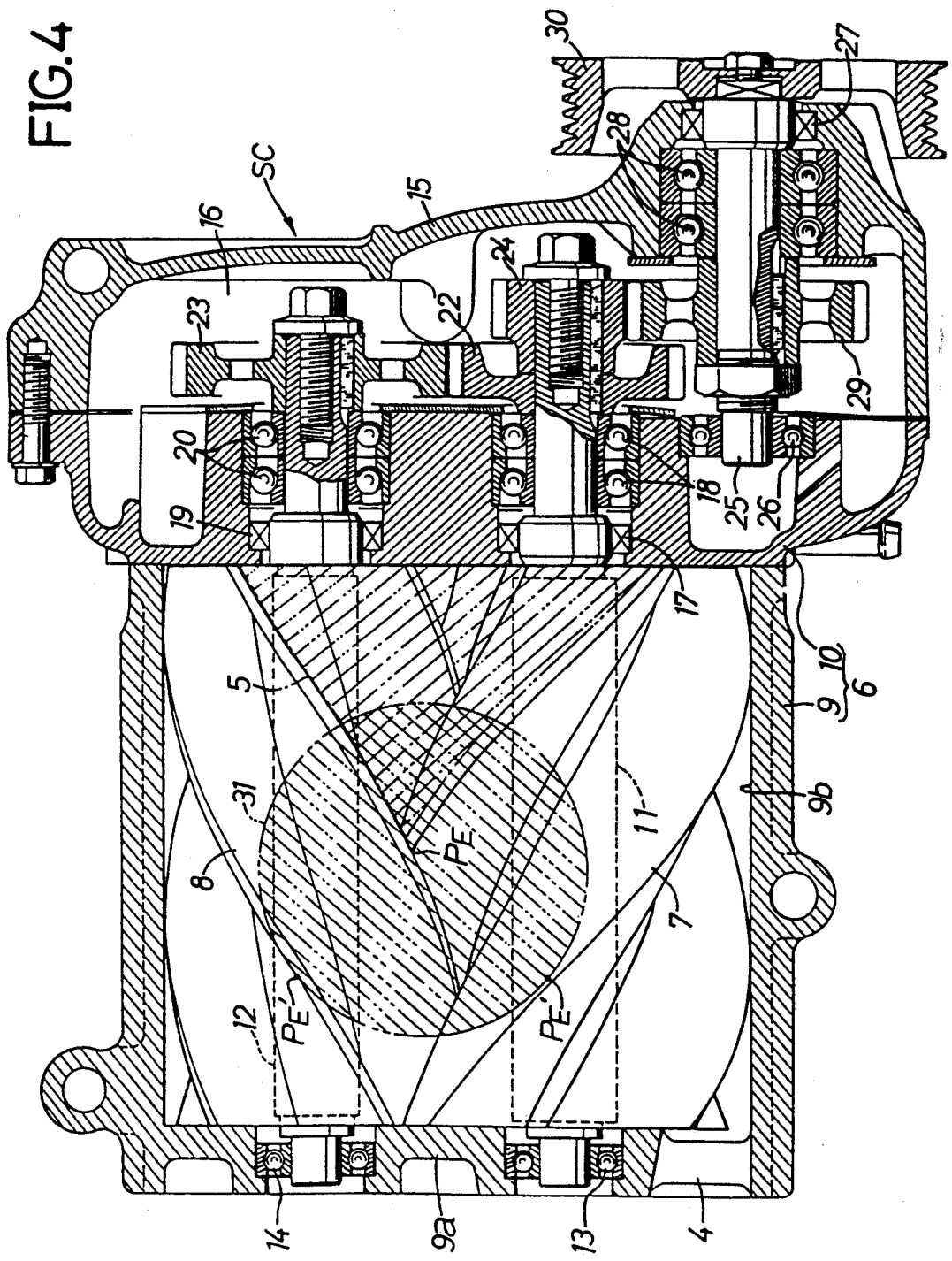
FIG. 4 is a sectional view taken along a line IV—IV in FIG. 2.

Referring to FIGS. 2, 3 and 4, the mechanical supercharger SC is comprised of a main rotor 7 and a gate rotor 8 which are a pair of screw rotors meshed with each other and rotatably supported in a housing 6. Air is drawn through an intake port 4 provided in one axial end of the housing 6 and is discharged through a discharge port 5 provided in the other axial end by the rotors 7 and 8 which are mechanically rotated by the engine body E.

The housing 6 is comprised of a cylindrical member 9 formed into a bottomed cylindrical shape with one end closed by an end wall 9a, and an end wall member 10 coupled to the other end of the cylindrical member 9 to cover that open end. The cylindrical member 9 is formed to have a cross-sectional shape corresponding to the rotational locus described by the radially outer end of each of the rotors 7 and 8 and has an inner surface 9b which does not come into contact with the rotors 7 and 8. The intake port 4 is provided in the end wall 9a.

The rotors 7 and 8 are secured to rotary shafts 11 and 12, respectively, which are carried at one end on the end wall 9a of the cylindrical member 9 by bearings 13 and 14, respectively, interposed therebetween. A cover 15 is coupled to the end wall member 10 to define a gear chamber 16 between the cover 15 itself and the end wall member 10. The other ends of the rotary shafts 11 and 12 pass through the end wall member 10 to project into the gear chamber 16. A sealing member 17 and a pair of bearings 18 are interposed between the rotary shaft 11 and the end wall member 10, and a sealing member 19 and a pair of bearings 20 are interposed between the rotary shaft 12 and the end wall member 10.

Gears 22 and 23 which are meshed with each other are fixed to the rotary shafts 11 and 12, respectively, within the gear chamber 16 and in addition to the gear 22, a gear 24 is fixed to the rotary shaft 11. A shaft 25 is rotatably supported at one end on the end wall member 10 by a bearing 26 interposed therebetween and has an axis parallel to the rotary shafts 11 and 12. The shaft 25 extends through the cover 15 to project outwardly. A sealing member 27 and a pair of bearings 28 are interposed between the shaft 25 and the cover 15. A gear 29 which is meshed with the gear 24 is fixed to the shaft 25 within the gear chamber 16, and a pulley 30 is fixed to an outer end of the shaft 25 which projects from the cover 15. Power from a crankshaft 21 (see FIG. 1) of the engine E is transmitted to the pulley 30 through an endless belt which is not shown, thereby causing the main rotor 7 and the gate rotor 8 to be meshed with each other for rotation.

A piston 31 is disposed on a side of the cylindrical portion 9 in the housing 6 at a location corresponding to meshed portions of the main rotor 7 and the gate rotor 8 for movement between a high-compression position (a position shown by dashed lines in FIGS. 2 and 3) inwardly in a moving direction 32 substantially perpendicular to the axes of the screw rotors 7 and 8 and a low-compression position (a position shown by solid lines in FIGS. 2 and 3) outwardly in the moving direction 32. More specifically, the cylindrical member 9 is integrally provided at its side with a cylindrical guide portion 33 having a circular cross-section and extending in a direction perpendicular to the axes of the rotors 7 and 8, and the piston 31 is disposed within the cylindrical guide portion 33 for movement in the moving direction 32. The piston 31 is formed into a circular shape in cross section with the outside diameter thereof smaller than the inside diameter of the cylindrical guide portion 33 and is not supported by the cylindrical guide portion 33.

The piston 31 is formed into a bottomed cylindrical shape with a closed end thereof directed into the housing 6 and provided at its opened end, i.e. at its outer end, with a collar 31a projecting radially outwardly. A large diameter portion 33a is provided through an outwardly facing step 33b on an inner surface of the cylindrical guide portion 33 at a location closer to the axially outer end thereof to receive the collar 31a and the extreme axial positions of the piston 31 are defined by a case 40 coupled to an outer end of the cylindrical guide portion 33 and by the step 33b. An axially extending key 34 is secured at one place in the inner surface of the cylindrical guide-portion 33, and the collar 31a of the piston 31 is provided with a notch 31b into which the key 34 is fitted. Thus, the piston 31 is prevented by the key 34 from being rotated about its axis and is movable for a limited distance in the moving direction 32.

The discharge port 5 is defined by cooperation of the piston 31 with a lead-out section 35 provided at an axial end of the housing 6 at a location corresponding to the meshed portions of the main rotor 7 and the gate rotor 8. The lead-out section 35 is comprised of a protrusion 9c provided at the open end of the cylindrical member 9 of the housing 6 to protrude outwardly from an inner surface 9b and a lead-out tube 36 provided on the end wall member 10. The portion of the piston 31 which faces into the housing 6 is formed in such a manner that the distance from the intake port 4 to a discharge starting position $P_E$ of the discharge port 5 at the time when the piston 31 is in the inward or high-compression position is larger than the distance from the intake port 4 to discharge starting positions $P_E'$ and $P_E'$ at the time when the piston 31 is in the outward or low-compression position. The piston 31 is provided, at the portion facing into the housing 6, with a surface 31c smoothly connected to the inner surface of the housing 6 and a surface 31d smoothly connected to an inner surface 35a of the lead-out section 35 when the piston 31 is in the high-compression position. Thus, when the piston 31 is in the high-compression position, a portion shown by the oblique dashed lines inclined downwardly to the right in FIG. 4 serves as the discharge port 5, and the junction between the surfaces 31c and 31d is the discharge starting position $P_E$. When the piston 31 is in the low-compression position, a portion shown by the oblique dashed lines inclined both downwardly to the left and to the right in FIG. 4 serves as the discharge port 5 by the fact that the surface 31c is located more outwardly than the inner surface 9b of the housing 6, and the two positions in which grooves in the rotors 7 and 8 first communicate with the discharge port 5 in response to the rotation of the rotors 7 and 8 are the discharge starting positions $P_E'$ and $P_E'$. Thus, when the piston 31 is in the low-compression position and the discharge starting positions $P_E'$ and $P_E'$ are close to the intake port 4, an internal compression ratio $\epsilon$ is 1.0. When the piston 31 is in the high-compression position and the discharge starting position $P_E$ is spaced apart from the intake port 4, the internal compression ratio $\epsilon$ is, for example, 1.3.

A drive means 38 is connected to the piston 31 and comprises the case 40 coupled to the outer end of the cylindrical guide portion 33 to define a back pressure chamber 39 between the case 40 itself and the piston 31, a diaphragm 41 housed in the case 40 and clamped at its peripheral edge by the case 40, and a spring 42 mounted in a compressed manner between the diaphragm 41 and the case 40. The case 40 is comprised of a pair of case members 43 and 44 coupled to each other, and the peripheral edge of the diaphragm 41 is clamped between the case members 43 and 44. The interior of the case 40 is divided by the diaphragm 41 into an atmospheric pressure chamber 45 inwardly in the moving direction 32 of the piston 31 and a control chamber 46 outwardly in the moving direction 32. The spring 42 is received in the atmospheric pressure chamber 45 to produce a spring force for biasing the diaphragm 41 in a direction to reduce the volume of the control chamber 46. A through hole 47 is provided at the central portion of the case member 44 that partitions the back pressure chamber 39 and the atmospheric pressure chamber 45 in the case 40, and a cylindrical bearing sleeve 48 is fitted and fixed in the through hole 47. The piston 31 is integrally provided with a connecting rod 31e extending in the moving direction 32. The bearing sleeve 48 slidably supports the connecting rod 31c and is connected to a central portion of the diaphragm 41.

In this way, the piston 31 is not supported by the cylindrical guide portion 33 but rather is supported on the drive means 38 through the connecting rod 31e. This ensures that the sliding contact area of the piston 31 at the time when it is moved in the moving direction 32 can be reduced to minimize the friction loss and to prevent a sticking of the piston 31 within the cylindrical guide portion 33 due to a deformation of the piston 31 by thermal influence because the piston 31 is close to the discharge port 5 which has a relatively high temperature.

Such drive means 38 allows the piston 31 to be moved inwardly to the high-compression position against the spring force of the spring 42 by increasing the pressure in the control chamber 46, and allows the piston 31 to be moved outwardly to the low-compression position by the spring force of the spring 42 when the pressure in the control chamber 46 is reduced.

The piston 31 is also provided with a communication hole 49 for putting the back pressure chamber 39 into communication with the discharge port 5, so that the pressure in the back pressure chamber 39 is equal to the discharging pressure in the discharge port 5.

Referring again to FIG. 1, a conduit 51 is connected to the intake passage 1 at a location corresponding to the point where the bypass passage 3 joins passage 1 downstream of the intercooler IC. A conduit 52 is connected to the control chamber 46 in the drive means 38. A switchover valve V is provided between a passage 54 opened into the atmosphere through an air cleaner 53 and the conduits 51 and 52 and is capable of alternatively switching-over the connection and disconnection of the passage 54 and the conduits 51 and 52. The switchover valve V is a solenoid valve which is capable of being shifted between a state in which the passage 54 is put into communication with the conduit 52 upon energization thereof, i.e., a state in which the atmospheric pressure is introduced into the control chamber 46, and a state in which the conduit 51 is put into communication with the conduit 52 upon de-energization thereof, i.e. a state in which a discharging pressure $P_2$ is introduced into the control chamber 46.

The shifting operation of the switchover valve V and the operation of a bypass valve driving means 55 for driving a bypass valve $V_{BP}$ for opening and closing are controlled by a control means C including a microcomputer. The control means C controls the operations of the switchover valve V and the bypass valve driving means 55 in accordance with the throttle opening degree $\Theta_{TH}$ of the throttle valve $V_{TH}$, the engine revolution rate $N_E$, the bypass opening degree $\Theta_{BP}$ of the bypass valve $V_{BP}$ and the supercharge pressure $P_2$. Signals are supplied to the control means C from a revolution rate detecting sensor $S_{NE}$ for detecting the engine revolution rate $N_E$, a throttle opening degree detecting sensor $S_{TH}$ for detecting the throttle opening degree $\Theta_{TH}$ and a supercharge pressure detecting sensor $S_{P2}$ located in the middle of the conduit 51.

Figure 5A:
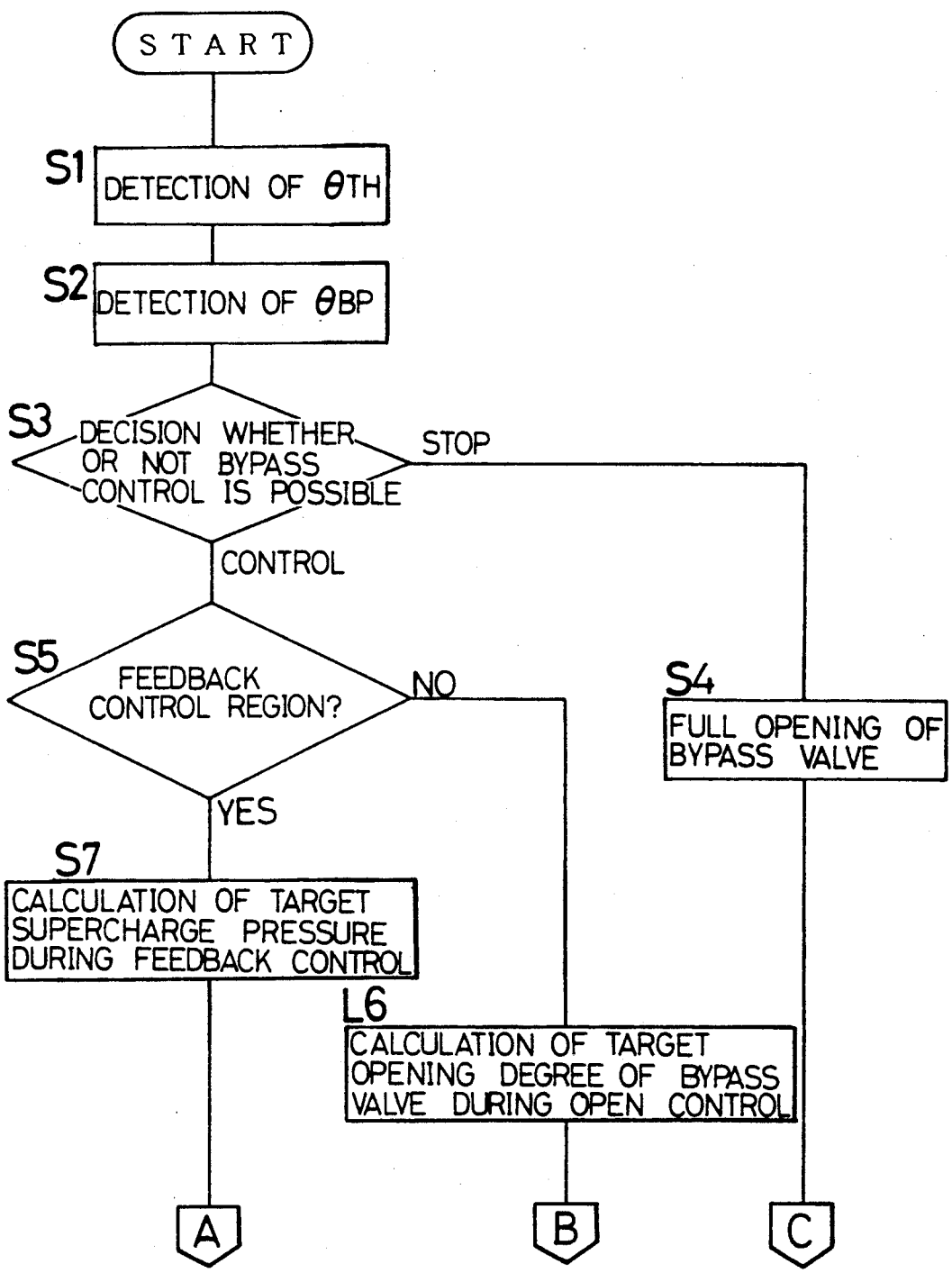

The control procedure established in the control means C now will be described. At a first step S1 and a second step S2 in FIG. 5A, the throttle opening degree $\Theta_{TH}$ and the bypass opening degree $\Theta_{BP}$ are detected, respectively, and then the procedure progresses to a third step S3. At the third step S3, it is decided whether or not a bypass control is possible. More specifically, when the temperature of the intake gas is too low or high, and/or the temperature of the engine-cooling water is too low or high, and/or the engine load is extremely high, the bypass valve $V_{BP}$ is fully opened at a fourth step S4 to stop the bypass control, and, thereafter, the processing is advanced to the twelfth step S12. When the engine is in a more normal operational state outside of the above conditions, the processing is advanced to a fifth step S5 to carry out the bypass control.

Figure 6:
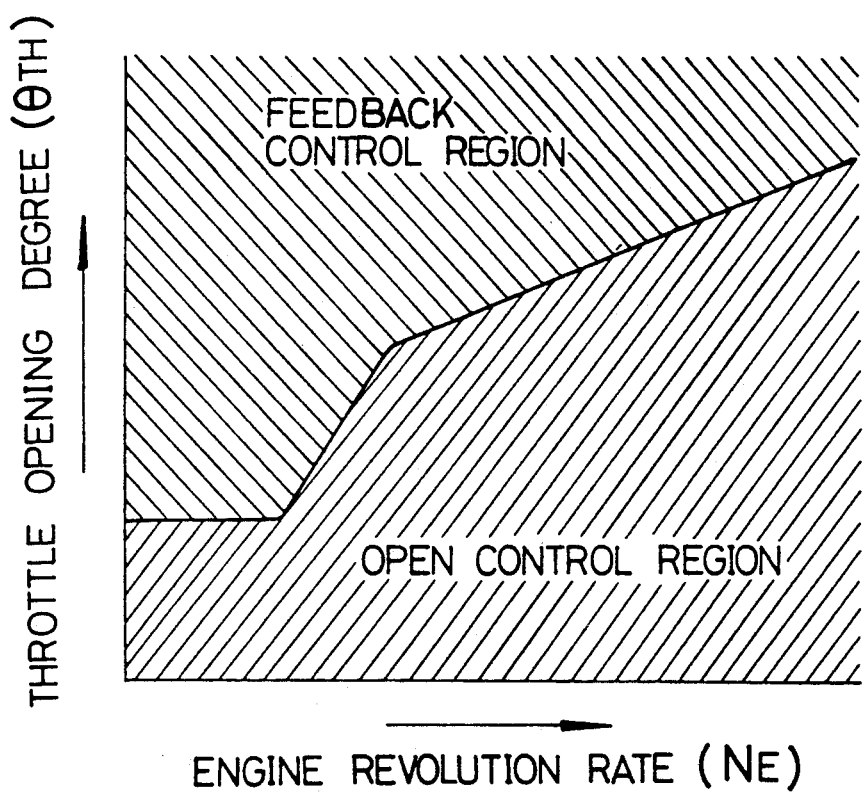
FIG. 6 is a diagram illustrating a map in which an open control region and a feed-back control region are determined.

At the fifth step S5, it is decided whether or not the throttle opening degree $\Theta_{TH}$ and the engine revolution rate $N_E$ are in a feed-back control region on the basis of a map shown in FIG. 6. More specifically, the feed-back control region is established in an area in which the engine revolution rate $N_E$ is relatively low and the throttle opening degree $\Theta_{TH}$ is relatively large. In this region, the supercharge pressure $P_2$ is difficult to vary by controlling the opening and closing of the throttle valve $V_{TH}$, but controlling the opening and closing of the bypass valve $V_{BP}$ is primarily effective and therefore, the feed-back control is carried out. In an open control region in which the engine revolution rate $N_E$ is relatively high and the throttle opening degree is relatively small, the supercharge pressure $P_2$ can be easily varied by controlling the opening and closing of the throttle valve $V_{TH}$ and, therefore, an open control is carried out. It should be noted that a boundary value between the feed-back control region and the open control region is set to have a hysteresis.

Figure 7:
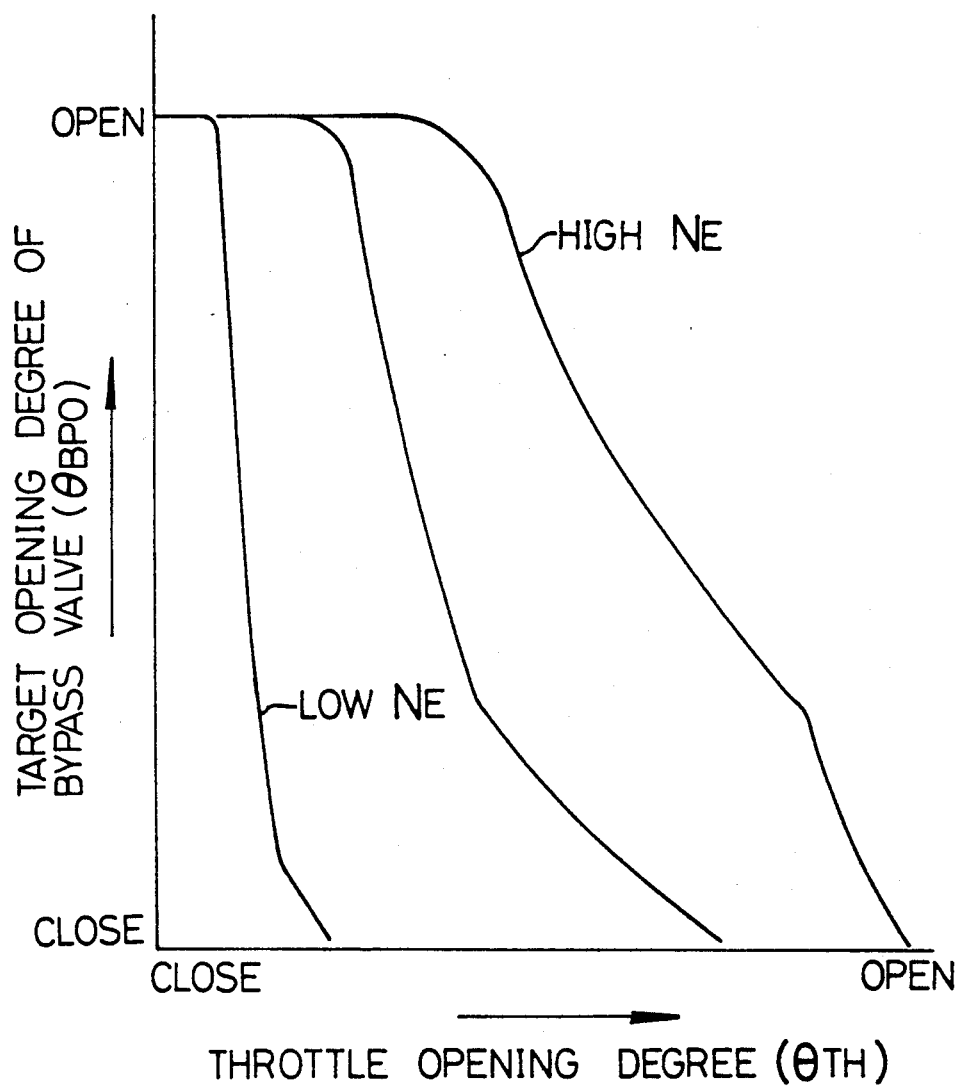
FIG. 7 is a diagram illustrating the target opening degree of the bypass valve relative to the throttle opening degree.

If it has been decided at the fifth step S5 that the throttle opening degree $\Theta_{TH}$ and the engine revolution rate $N_E$ are in the open control region, the processing is advanced to a sixth step S6 at which a target opening degree $\Theta_{BPO}$ of the bypass valve $V_{BP}$ at the open control is calculated from a map previously established as shown in FIG. 7 and thereafter, the processing is advanced to the twelfth step S12. More specifically, the target opening degree $\Theta_{BPO}$ corresponding to the throttle opening degree $\Theta_{TH}$ is previously set for every engine revolution rate $N_E$ and hence, the target opening degree $\Theta_{BPO}$, which becomes larger as the throttle opening degree $\Theta_{TH}$ is lower, is calculated at the sixth step S6.

Figure 8:
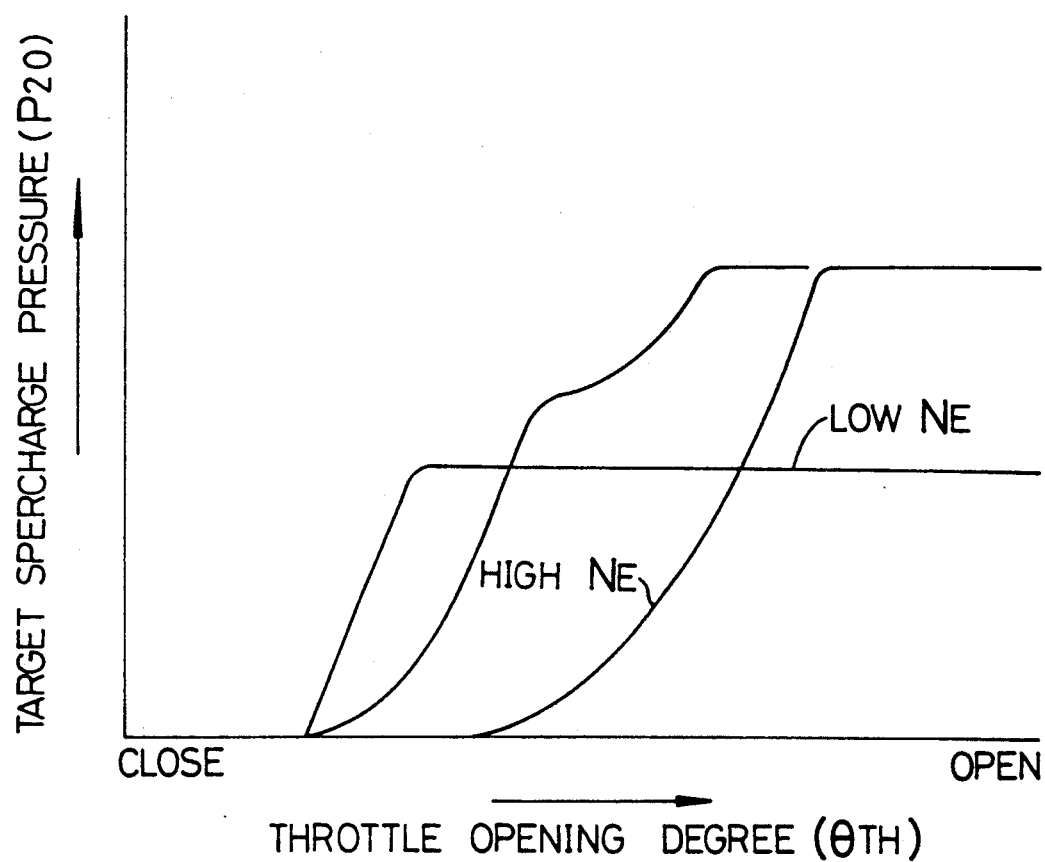
FIG. 8 is a diagram illustrating the target supercharge pressure relative to the throttle opening degree.

If it has been decided at the fifth step S5 that the throttle opening degree $\Theta_{TH}$ and the engine revolution rate $N_E$ are in the feed-back control region, the processing is advanced to a seventh step S7 at which a target supercharge pressure $P_{20}$ in the feed-back control region is calculated from a map previously established as shown in FIG. 8. More specifically, the target supercharge pressure $P_{20}$ corresponding to the throttle opening degree $\Theta_{TH}$ is previously set for every engine revolution rate $N_E$ and hence, the target supercharge pressure $P_{20}$ corresponding to the engine revolution rate $N_E$ and the throttle opening degree $\Theta_{TH}$ is calculated.

At a next eighth step S8, it is decided whether or not the difference between the target supercharge pressure $P_{20}$ calculated at the seventh step S7 and the supercharge pressure $P_2$ detected in the supercharge pressure detecting sensor $S_{P2}$ is large. If it has been decided that such difference is large, the bypass valve $V_{BP}$ is fully closed and thereafter, the processing is advanced to the twelfth step S12.

If it has been decided at the eighth step S8 that the difference between the target supercharge pressure $P_{20}$ and the supercharge pressure $P_2$ is small, the processing is advanced to a tenth step S10 at which the target opening degree of the bypass valve $V_{BP}$ is calculated on the basis of the target supercharge pressure $P_{20}$ provided at the seventh step S7. Next, at an eleventh step S11, a calculation of a deviation learning item used in a feed-back calculation is carried out.

At the twelfth step S12, a limit check for judging whether or not the target opening degree of the bypass valve $V_{BP}$ is outside of a predetermined range is carried out. Next, the bypass valve $V_{BP}$ is operated at a thirteenth step S13, and thereafter, at a fourteenth step S14, the control of the shifting operation of the switchover valve V is carried out according to a subroutine shown in FIG. 9.

At a first step L1 of the subroutine in FIG. 9, it is decided whether or not the throttle opening degree $\Theta_{TH}$ exceeds a predetermined preset throttle opening degree $\Theta_{SOLL}$ ($\Theta_{TH} > \Theta_{SOLL}$). The preset throttle opening degree $\Theta_{SOLL}$ is used as a judging criterion for forcibly reducing the internal compression ratio on the basis of the fact that when the throttle opening degree $\Theta_{TH}$ is small, it is not required to increase the internal compression ratio of the supercharger SC and the supercharge pressure $P_2$ also remains small, because the bypass valve $V_{BP}$ is open. The preset throttle opening degree $\Theta_{SOLL}$ is set, for example, at 15/10 degrees to have a hysteresis. When $\Theta \leq \Theta_{SOLL}$, the processing is advanced to the second step L2 at which the counting down of a delay timer t that is set, for example, at 3 seconds is started. Next, a third step L3, the switchover valve V is energized to permit the atmospheric pressure to be introduced into the control chamber 46.

If it has been decided at the first step L1 and $\Theta_{TH} > \Theta_{SOLL}$, the processing is advanced to a fourth step L4 at which it is decided whether or not the engine revolution rate $N_E$ exceeds a preset revolution rate $N_{SOL}$ ($N_E > N_{SOL}$). The present revolution rate $N_{SOL}$ is used as a judging criterion for forcibly reducing the internal compression ratio of the supercharger SC, because an increase in supercharge pressure $P_2$ cannot be expected in a condition in which the engine revolution rate $N_E$ is low. The preset revolution rate $N_{SOL}$ is set, for example, at 1,200/1,000 rpm to have a hysteresis. If it has been decided that $N_E \leq N_{SOL}$, the processing is advanced to the second step L2. On the other hand, if it has been decided that $N_E > N_{SOL}$, the processing is advanced to a fifth step L5.

At the fifth step L5, it is decided whether or not the throttle opening degree $\Theta_{TH}$ exceeds a predetermined preset throttle opening degree $\Theta_{SOLH}$ ($\Theta_{TH} > \Theta_{SOLH}$).

The preset throttle opening degree $\Theta_{SOLH}$ is used to judge whether or not the vehicle driver desires to accelerate. The preset throttle opening degree $\Theta_{SOLH}$ is set, for example, at 60/50 degree to have a hysteresis. If it has been decided that $\Theta_{TH} > \Theta_{SOLH}$, the processing is advanced to a sixth step L6 on the basis of the decision that the vehicle driver desires to accelerate. At the sixth step L6, it is decided whether or not the supercharge pressure $P_2$ exceeds a preset supercharge pressure $P_{SOLH}$ ($P_2 > P_{SOLH}$). The preset supercharge pressure $P_{SOLH}$ is used to avoid noise that normally is produced due to a pulsing when the internal compression ratio of the supercharge SC in a condition in which a sufficient supercharge pressure $P_2$ cannot be obtained, even if the driver desires to accelerate. The preset supercharge pressure $P_{SOLH}$ is set, for example at 300 mm Hg. If it has been decided that $P_2 \leq P_{SOLH}$, the processing is advanced to the second step L2. On the other hand, if it has been decided that $P_2 > P_{SOLH}$, the processing is advanced to a thirteenth step L13.

If it has been decided at the fifth step L5 that $\Theta_{TH} \leq \Theta_{SOLH}$, the processing is advanced to a seventh step L7 at which a searching of a switchover region on the basis of the engine revolution rate $N_E$ and the supercharge pressure $P_2$ is carried out. Specifically, the processing is advanced to the seventh step L7 on conditions that the engine revolution rate $N_E$ and the throttle opening degree $\Theta_{TH}$ are within a range shown by an oblique line inclined downwardly to the left in FIG. 10 on the basis of the decisions up to the fifth step L5, and at the seventh step L7 it is searched from a map established as shown in FIG. 11 whether either the atmospheric pressure or the supercharge pressure $P_2$ is to be introduced into the control chamber 46 in the drive means 38 within such range. A boundary value between an atmospheric pressure introducing region and a supercharge pressure introducing region has a hysteresis, and the supercharger SC in its high-compression state produces the larger supercharge pressure as the engine revolution rate $N_E$ is higher. Therefore, the boundary value is set such that the supercharge pressure introducing region is defined to introduce a larger supercharger pressure as the engine revolution rate $N_E$ is larger.

If it has been decided at an eighth step L8 that the engine revolution rate $N_E$ and the supercharge pressure $P_2$ are in the atmospheric pressure introducing region, the processing is advanced to the second step L2. On the other hand, if it has been decided that the engine revolution rate $N_E$ and the supercharge pressure $P_2$ are in the supercharge introducing region, the processing is advanced to a ninth step L9.

At the ninth step L9, it is decided whether the variation rate $\Delta\Theta_{TH}$ in throttle opening degree $\Theta_{TH}$ is larger than a predetermined value. If it has been decided that the variation rate $\Delta\Theta_{TH}$ is larger than the predetermined value, the processing is advanced to the thirteenth step L13 on the basis of the decision that there is a need to increase the speed of the vehicle. If it has been decided that the variation rate $\Delta\Theta_{TH}$ is smaller than the predetermined value, the processing is advanced to a tenth step L10. It is decided at the tenth step L10 whether the throttle opening degree $\Theta_{TH}$ exceeds a preset throttle opening degree $\Theta_{DEL}$, e.g. 40 degree ($\Theta_{TH} > \Theta_{DEL}$). If it has been decided that $\Theta_{TH} > \Theta_{DEL}$, the processing is advanced to the thirteenth step L13, while if it has been decided that $\Theta_{TH} \leq \Theta_{DEL}$, the processing is advanced to an eleventh step L11. Further, it is decided at the eleventh step L11 whether or not the engine revolution rate $N_E$ exceeds a preset revolution rate $N_{DEL}$, e.g. 5,000 rpm ($N_E > N_{DEL}$) If it has been decided that $N_E > N_{DEL}$, the processing is advanced to the thirteenth step L13, while if it has been decided that $N_E \leq N_{DEL}$, the processing is advanced to a twelfth step L12.

At the twelfth step L12, it is decided whether or not the delay timer t has reached "0", i.e., a predetermined time has elapsed after the start of counting-down of the delay timer t at the second step L2. If it has been decided that "0" has not been reached, the processing is advanced to the third step L3, while if it has been decided that the predetermined time has been lapsed and thus, "0" has been reached, the processing is advanced to the thirteenth step L13.

At the thirteenth step L13, the delay timer t is reset when the processing is advanced thereto from any of the sixth, ninth, tenth or eleventh steps L6, L9, L10 and L11. At a next fourteenth step L14, the switchover valve V is operated to permit the supercharge pressure $P_2$ to be introduced into the control chamber 46.

Figure 9A:
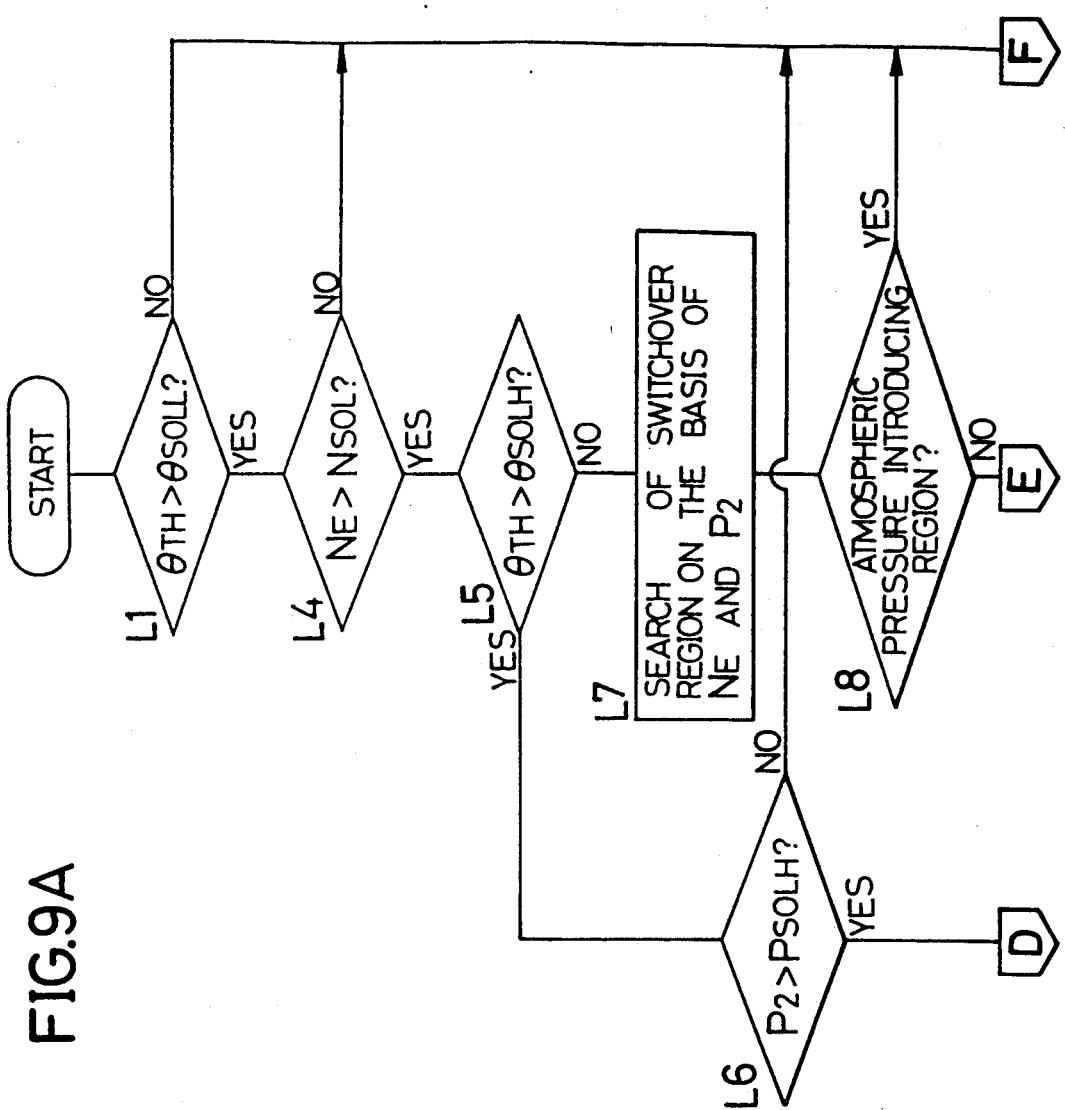
FIGS. 9A and 9B are a flow chart illustrating a subroutine for controlling the compression ratio of the supercharger.
Figure 9B:
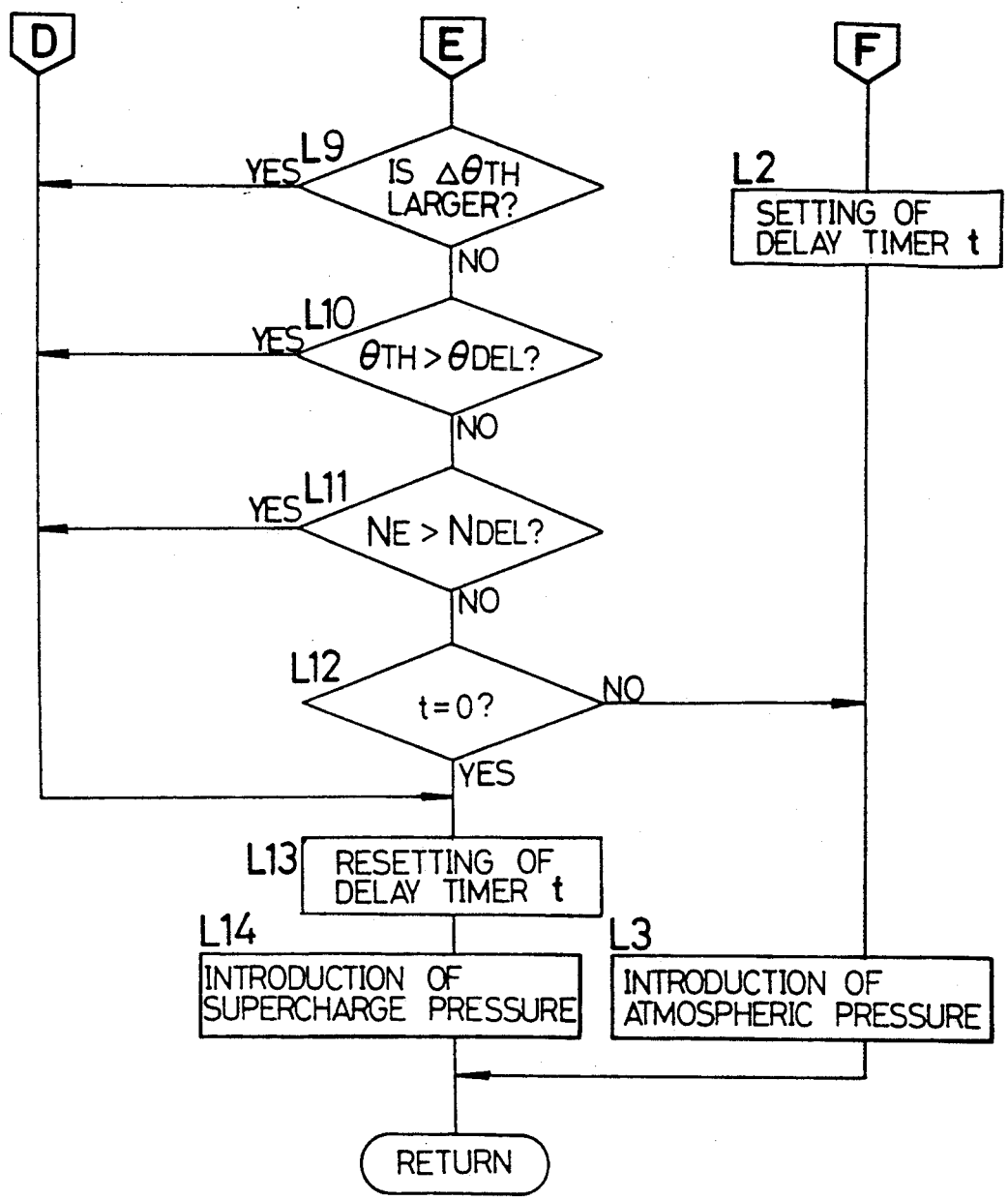

Such subroutine shown in FIGS. 9A and 9B ensures that, as shown in FIG. 10, the operation of the switchover valve V is controlled in accordance with the engine revolution rate $N_E$ and the throttle opening degree $\Theta_{TH}$, so that the switchover valve V is shifted between the state in which the atmospheric pressure is introduced into the control chamber 46 to provide a compression ratio $\epsilon$ of 1.0 and the state in which the supercharge pressure $P_2$ is introduced into the control chamber 46 to provide the compression ratio $\epsilon$ of 1.3. Moreover, in a region in which $\Theta_{SOLL} < \Theta_{TH} \leq \Theta_{SOLH}$ and $N_E > N_{SOL}$, the operation of the switchover valve V is controlled in a shifted manner according to the map shown in FIG. 7, but even within such region and particularly in a region in which $\Theta_{TH} \leq \Theta_{DEL}$ and $N_E \leq N_{DEL}$, the shift of the switchover valve V to the state in which the supercharge pressure $P_2$ is introduced into the control chamber 46 to provide the compression ratio $\epsilon$ of the supercharger SC of 1.3 is avoided unless the state permitting the compression ratio $\epsilon$ to become 1.3 is maintained for a predetermined time, e.g., for at least 3 seconds.

The operation of this embodiment now will be described. In a condition in which the atmospheric pressure has been introduced into the control chamber 46 in the drive means 38 through the switchover valve V, the piston 31 is in the low-compression position, and the discharge starting positions $P_E'$ and $P_E'$ are close to the intake port 4, thereby permitting the compression ratio $\epsilon$ to become 1.0. If the switchover valve V is shifted to the state in which the supercharge pressure $P_2$ is introduced into the control chamber 46, the piston 31 is brought into the high-compression position, and the discharge starting position $P_E$ is spaced further away from the intake port 4, permitting the internal compression ratio to become 1.3.

In this supercharger SC, the piston 31 is movable in the moving direction substantially perpendicular to the axes of the main rotor 7 and the gate rotor 8 and hence, an increase in size of the housing 6 is avoided, ensuring that even if a distribution of temperature in an axial direction of the housing is produced, there is no disadvantage due to a difference in thermal expansion amount. In addition, a gas is not circulated and hence, a reduction in efficiency of operation is avoided.

Further, the provision of the communication hole 49 in the piston 31 for permitting the communication of the discharge port 5 with the back pressure chamber 39 ensures that an equal pressure can be applied to the opposite surfaces of the piston 31 to stably maintain the position of the piston 31, and the operation power required to move the piston 31 during shifting can be reduced.

Moreover, in the drive means 38, the piston 31 is brought into the high-compression position by a pressure discharged from the supercharger SC and, therefore, a dynamic pressure in the supercharger SC that would cause the position of the piston 31 to be unstable is avoided, thereby preventing a reduction in efficiency due to the position of the piston 31 being unstable. To the contrary, if the piston 31 were brought into the high-compression position by the spring force of the spring 42, the position of the piston 31 would be unstable due to the dynamic pressure in the high-compression state.

The shifting operation of the switchover valve V, i.e., the switching-over of the internal compression rate $\epsilon$ of the supercharger SC, is controlled in accordance with the supercharge pressure $P_2$ and the engine revolution rate $N_E$ and, therefore, pulsing due to a difference between the pressure in the supercharger SC and the supercharge pressure $P_2$ according to the engine revolution rate $N_E$ is avoided, thereby preventing a noise from being produced due to the pulsing.

In switchover from the low-compression state to the high-compression state, the bypass valve $V_{BP}$ is closed and hence, it is difficult for any noise produced on the discharge side of the supercharger SC to leak through the air cleaner A to the outside. Therefore, even if the switchover is delayed somewhat, the noise cannot leak out. In addition, the frequency of operation of the piston 31 can be suppressed to a small extent, leading to an improved durability, because the low-compression state cannot be switched over to the high-compression state unless the predetermined time, e.g., at least 3 seconds has elapsed. Moreover, if the driver has a strong desire to accelerate, i.e., if $\Delta\Theta_{TH}$ is equal to or more than the predetermined value, $\Theta_{TH} > \Theta_{DEL}$ and $N_E > N_{DEL}$, the low-compression state is immediately switched over to the high-compression state and hence, there is no problem in the response time.

Because the bypass valve $V_{BP}$ is opened in switching-over from the high-compression state to the low-compression state, any noise can be prevented from being leaked to the outside by conducting the switching-over without a delay.

Further, because a reference value of the supercharge pressure $P_2$ for switching-over from the low-compression state to the high-compression state is set such that it is larger as the engine revolution rate $N_E$ is larger, it is possible to switch over the internal compression ratio $\epsilon$ to a value appropriately corresponding to the supercharge pressure $P_2$, leading to an improvement in efficiency.

What is claimed is:

1. A method for controlling the supercharge pressure in an internal combustion engine having a mechanical supercharger which is connected to a crankshaft in the engine, which supercharger is of a type having means for selectively varying an internal compression ratio of the supercharger, wherein the method includes the step of controlling a variation of the internal compression ratio of the mechanical supercharger on the basis of at least a preset supercharge pressure and an engine revolution rate.

2. A method for controlling the supercharge pressure in an internal combustion engine according to claim 1, wherein in varying the internal compression ratio of the mechanical supercharger from a low level to a high level, the internal compression ratio is increased after a state, which satisfies a condition for increasing the internal compression ratio, is maintained for a predetermined time.

3. A method for controlling the supercharge pressure in an internal combustion engine according to claim 2, wherein the internal compression ratio is immediately increased when a driver's desire to accelerate is detected within the predetermined time.

4. A method for controlling the supercharge pressure in an internal combustion engine according to claim 1, wherein a reference value of the supercharge pressure, for increasing the internal compression ratio of the mechanical supercharger, is set such that it is larger as the engine revolution rate is higher.

5. A method for controlling the supercharge pressure in an internal combustion engine according to claim 1, wherein the minimum value of the internal compression ratio is of 1.0.

6. A method for controlling the supercharge pressure in an internal combustion engine according to claim 1, wherein the supercharge pressure is controlled to match the internal compression ratio upon varying the internal compression ratio for inhibiting pulsing and noise.

7. A method for controlling the supercharge pressure in an internal combustion engine having a mechanical supercharger which is driven from a crankshaft in the engine, which supercharger is of a type having means for selectively varying the internal compression ratio of the supercharger, wherein the method includes the step of, upon varying the internal compression ratio of the mechanical supercharger from a low level to a high level in response a change in engine operating conditions, the internal compression ratio is increased after a state, which satisfies a condition for increasing the internal compression ratio, has been maintained for a predetermined time.

8. A method for controlling the supercharge pressure in an internal combustion engine according to claim 7, wherein the internal compression ratio is immediately increased when a driver's desire to accelerate is detected within the predetermined time.

9. A method for controlling the supercharge pressure in an internal combustion engine according to claim 7, wherein a reference value of the supercharge pressure for increasing the internal compression ratio of the mechanical supercharger is set such that it is larger as the engine revolution rate is higher.

* * * * *